United States Patent Office 3,459,689
Patented Aug. 5, 1969

3,459,689
PHOSPHITE ACTIVATORS FOR SULFUR VULCANIZATION OF POLYURETHANES
Ira Starer, Bridgewater Township, Somerset County, and Henry William Cornell, Piscataway, N.J., assignors to American Cyanamid Company, Stamford, Conn., a corporation of Maine
No Drawing. Filed Mar. 14, 1966, Ser. No. 533,785
Int. Cl. C08g 22/04
U.S. Cl. 260—22                9 Claims

ABSTRACT OF THE DISCLOSURE

The vulcanization rate in sulfur-vulcanizing olefinic polyurethanes in the presence of zinc chloride complexes of 2,2'-dithiobisbenzothiazole is improved by providing in the vulcanization mixture an alkyl, aryl, aralkyl or alkaryl phosphite such as triphenyl phosphite. Optionally, for improved resistance to yellowing, the vulcanization mixture may additionally contain a stearic acid metal salt such as cadmium stearate.

---

This invention relates to the sulfur-vulcanization of unsaturated polyurethane elastomers. More particularly, it relates to the use of organic phosphites as activators in the sulfur-vulcanization of sulfur-vulcanizable olefinic polyurethane elastomers (millable gums).

Polyurethanes containing pendant, non-benzenoid —CH=CH— groups are sulfur-vulcanizable. In addition to accelerators, such as 2-mercaptobenzothiazole (MBT) and 2,2'-dithiobisbenzothiazole (MBTS), activators, such as the zinc chloride complexes of MBTS or MBT (U.S. Patent 2,846,416) and cadmium stearate, or combinations thereof, are also used in order to obtain reasonable and practical vulcanization rates.

It is often advantageous to use combinations of activators for maximum activating effect. For example, the combination of zinc chloride complex of MBTS ($ZnCl_2 \cdot MBTS$) and cadmium stearate provides a vulcanizing rate that is satisfactorily fast for some purposes. However, sometimes it is desirable to carry out the vulcanization at an even faster rate. Furthermore, white-stock polyurethanes vulcanized in the presence of cadmium stearate are discolored, i.e., they have a yellow color (Yellow Index about 20). For some end products, as for cut elastomeric thread, the yellow color is highly undesirable. (The yellow color is perhaps due to the formation of yellow cadmium sulfide, during the vulcanization process.)

Although other stearates, such as sodium stearate, potassium stearate and ammonium stearate, in combination with $ZnCl_2 \cdot MBTS$, provide products of low color, the activating power of these combinations is inadequate.

The use of increased amounts of white pigments such as titanium dioxide to mask the yellow color is unsatisfactory. The products have increased density and altered physical properties.

Therefore, there is need of a powerful activator or combination of activators, usable in the sulfur-vulcanization of polyurethanes, and capable of providing non-discolored white-stock goods. It is an object of this invention to provide such an activator. Other objects will be apparent from the ensuring description of this invention. These and other objects have been accomplished in accordance with this invention in a simple and effective manner.

It has now been discovered that organic phosphites when used in combination with zinc chloride complexes of MBTS have a strong activating effect on the sulfur-vulcanization of polyurethanes containing sulfur-vulcanizable olefinic groups. The activating effect is improved still further by also using a metal stearate, i.e., a three-component activating system is employed.

Many sulfur-vulcanizable polyurethanes are available. For example, polyester and polyester-amide polyurethanes containing sulfur-vulcanizable olefinic groups are described in U.S. Patent 2,424,884. Polyether-polyurethanes with linear sulfur-vulcanizable olefinic groups are described in U.S. Patent 3,015,636. Polyether-polyurethanes and polyester-polyurethanes with sulfur-vulcanizable olefinic groups in side chains are described in U.S. Patents 2,808,391 and 3,043,807, respectively.

Considerable variation is permissible as to the amount of sulfur used. It will depend on the particular polyurethane and the desired product. In general, it will be in the range between about 0.5 and about 2% weight parts per 100 parts of polyurethane. In most cases, the preferred range is between 0.75 and 1.25 parts per 100 parts of polyurethane.

One or more standard accelerators of the type normally used in the vulcanization of rubber, both natural and synthetic, may be employed. These include, for example, 2-mercaptobenzothiazole (MBT), 2,2'-dithiobisbenzothiazole (MBTS), 2-mercaptothiazoline (2MT), the zinc salt of mercaptobenzothiazole and zinc dialkyl dithiocarbamates. Combinations of two or more accelerators are often preferred for versatility. In general, the total amount of accelerators used may range between about 2.5 and about 6.0 parts per 100 parts of polyurethane. In preferred practice, between 4.0 and 5.0 parts per 100 parts of polyurethane, are employed.

The organic phosphites of use in this invention may be alkyl phosphites, aryl phosphites, aralkyl phosphites, alkaryl phosphites, or mixed types and are exemplified by triphenyl phosphite, tri-naphthyl phosphite, tri-p-tolyl phosphite, tris(butylphenyl) phosphite, tris(p-octylphenyl) phosphite, tris(p-dodecylphenyl) phosphite, tris (2,4-dinonylphenyl) phosphite, phenyl didecyl, phosphite, phenyl 2,2-dimethyltrimethylene phosphite, 4,4'-isopropylidene-bis[butylphenyl bis(butylphenyl) phosphite], tributyl phosphite, triamyl phosphite, triheptyl phosphite, trioctyl phosphite, triisooctyl phosphite, etc. In the foregoing, it will be noted that alkyl moieties generally have 1–8 carbons and aryl moieties are of 1–2 rings.

The amount of phosphite used should be between 0.5 and 5.0 parts, preferably between 1 and 3 parts, per 100 parts of polyurethane.

The amount of zinc chloride complex of MBTS used can be between 0.25 and 2.0 parts, preferably between 0.35 and 1.5 parts, per 100 parts of polyurethane.

The stearates which may be used include sodium stearate, potassium stearate, cadmium stearate, etc. They may be present in a concentration of 0.2 to 2.0 parts for each 100 parts of polyurethane when they are used.

In addition to the sulfur, accelerators and activators, other additives and compounding ingredients may be used. These include conventional fillers and pigments, such as carbon black, clay, titanium dioxide, silica and the like.

The polyurethane, sulfur, accelerator, activator and other additives are compounded and milled, using the same conventional equipment and procedures normally employed in the rubber industry. The resultant compounded elastomers are cured with conventional equipment by heating for periods of 10–180 minutes at temperatures in the range of about 270° F. to 330° F.

In the foregoing description and following examples, the parts and percentages are on a weight basis.

The polyurethane used in Examples 1–7 was prepared by adding 934 parts of 3-allyloxy-1,2-propanediol to 23,230 parts of a commercially available prepolymer having an isocyanate content of about 2.5%. The mixture was stirred at 80–85° C. for about 10 minutes, after which the temperature was raised to 100° C. over a 10-minute period.

The prepolymer is the reaction product of 3,3'-dimethyl-4,4'-biphenylene diisocyanate and a hydroxyl-terminated polyester of molecular weight of 2,000 prepared by reacting an excess of ethylene/propylene glycol with adipic acid, the ratio of ethylene the propylene glycol being 90/10, respectively, and the ratio of isocyanate and ester being such as to produce an NCO content in the prepolymer of about 2.5%. The mixture was then discharged into lubricated containers which were heated at 105° C. for 48 hours. The resulting transparent gum was used in the milling operation.

EXAMPLE 1

Comparison of sodium stearate plus triphenyl phosphite vs. sodium stearate alone; white stock Two samples of polyurethane (white stock) were compounded with additives as shown below in Table I. Mooney scorch rates and vulcanization rates also are shown in Table I.

The Mooney scorch rates are shown as $t_5$ which represents the time in minutes for a five-point increase in the Mooney viscosity from the minimum viscosity at the temperature of measurement.

The vulcanizing rates are shown as $t\Delta_{30}$ which represents the time in minutes for a 30-point increase in Mooney viscosity at the temperature of measurement after the 5-point rise in viscosity of the Mooney scorch rate.

TABLE I

| Component | Parts A | Parts B |
|---|---|---|
| Polyurethane | 100 | 100 |
| Sulfur | 1 | 1 |
| Stearic acid | 0.5 | 0.5 |
| ZnCl$_2$·MBTS | 0.7 | 0.7 |
| Clay | 5 | 5 |
| Sodium stearate | 0.375 | 0.375 |
| Titanium dioxide | 15 | 15 |
| Triphenyl phosphite | | 1 |
| MBTS | 3 | 3 |
| MBT | 1 | 1 |

| | Mooney Scorch Rate, Minutes | |
|---|---|---|
| $t_5$ at 270° F | 36 | 20 |
| $t_5$ at 287° F | 20 | 13 |

| | Mooney Vulcanization Rate, Minutes | |
|---|---|---|
| $t\Delta_{30}$ at 270° F | 17 | 6 |
| $t\Delta_{30}$ at 287° F | 8 | 4 |

The lower values for Mooney scorch rate and vulcanizing rate of the elastomer containing triphenyl phosphite demonstrates the activating action of triphenyl phosphite in white stock using sodium stearate and zinc chloride: MBTS complex as cooperating activators.

Samples of the compounded polyurethanes were vulcanized by heating at 287° F. for the length of time shown in Table II. The physical properties of the vulcanized elastomers are shown in Table II.

"Set at Break" is the percent elongation which persists for ten minutes after the sample is broken by stretching.

The "Yellow Index" is a measurement of the amount of yellowness of the sample of vulcanized polyurethane. It is determined on a differential colorimeter ("Colormaster") using the following formula:

$$\text{Yellow Index} = 70 \left( 100 - \frac{\text{Blue}}{\text{Green}} \right)$$

TABLE II

| | A | B |
|---|---|---|
| Vulcanization time (min.) | 75 | 45 |
| Tensile strength (p.s.i.) | 5,060 | 5,015 |
| Modulus, 500% (p.s.i.) | 1,055 | 1,965 |
| Elongation (percent) | 625 | 645 |
| Set at break (percent) | 12.5 | 12.5 |
| Hardness, Shore A | 61 | 60 |
| Yellow index | 12.1 | 10.5 |

These results shown that by using triphenyl phosphite in the formulation, a shortened curing time can be used to provide a product equal or superior in physical properties.

EXAMPLE 2

Comparison of cadmium stearate plus triphenyl phosphite vs. cadmium stearate alone; white stock Two samples of polyurethane (white stock) were compounded with the additives shown below in Table III. Mooney scorch rates and vulcanizing rates also are shown in Table III.

TABLE III

| Component | Parts A | Parts B |
|---|---|---|
| Polyurethane | 100 | 100 |
| Stearic acid | 0.5 | 0.5 |
| Clay | 5 | 5 |
| Titanium dioxide | 15 | 15 |
| MBTS | 3 | 3 |
| MBT | 1 | 1 |
| Sulfur | 1 | 1 |
| ZnCl$_2$·MBTS | 0.7 | 0.7 |
| Cadmium stearate | 0.5 | 0.5 |
| Triphenyl phosphite | | 1 |

| | Mooney Scorch Rate, Minutes | |
|---|---|---|
| $t_5$ at 287° F | 17 | 7 |

| | Mooney Vulcanization Rate, Minutes | |
|---|---|---|
| $t\Delta_{30}$ at 287° F | 7 | 2 |

These results show the activating power of triphenyl phosphite in white stock when used in combination with cadmium stearate and zinc chloride complex.

EXAMPLE 3

Comparison of formulations containing triphenyl phosphite and ZnCl$_2$·MBTS vs. formulations containing no ZnCl$_2$·MBTS: white stock Four samples of polyurethane (white stock) were compounded with the additives shown below in Table IV. Mooney scorch rates and vulcanizing rates also are shown in Table IV.

TABLE IV

| Component | A | B | C | D |
|---|---|---|---|---|
| Polyurethane | 100 | 100 | 100 | 100 |
| Stearic acid | 0.5 | 0.5 | 0.5 | 0.5 |
| Clay | 5 | 5 | 5 | 5 |
| Titanium dioxide | 15 | 15 | 15 | 15 |
| MBTS | 3 | 3 | 3 | 3 |
| MBT | 1 | 1 | 1 | 1 |
| Sulfur | 1 | 1 | 1 | 1 |
| ZnCl$_2$·MBTS | | | 0.7 | 0.7 |
| Cadmium stearate | | 0.5 | | 0.5 |
| Triphenyl phosphite | 1 | 1 | 1 | 1 |

| | Mooney Scorch Rate, Minutes | | | |
|---|---|---|---|---|
| $t_5$ at 287° F | 35+ | 35+ | 21 | 7 |

| | Mooney Vulcanization Rate, Minutes | | | |
|---|---|---|---|---|
| $t\Delta_{30}$ at 287° F | | | 7 | 2 |

These results show that triphenyl phosphite alone or in combination with cadmium stearate has no measurable activating influence. It also shows that triphenyl phosphite with the zinc chloride-MBTS complex is moderately activating and that the combination of triphenyl phosphite, zinc chloride-MBTS complex and cadmium stearate is considerably activating.

EXAMPLE 4

Comparison of formulations using various amounts of triphenyl phosphite; white stock Two samples of polyurethane (white stock) were compounded with the additives shown below in Table V.

Mooney scorch rates and vulcanizing rates also are shown in Table V.

TABLE V

| Component | Parts | |
|---|---|---|
| | A | B |
| Polyurethane | 100 | 100 |
| Stearic acid | 0.5 | 0.5 |
| Clay | 5 | 5 |
| Titanium dioxide | 15 | 15 |
| MBTS | 3 | 3 |
| MBT | 1 | 1 |
| Sulfur | 1 | 1 |
| ZnCl$_2$.MBTS | 0.7 | 0.7 |
| Sodium stearate | 0.375 | 0.375 |
| Triphenyl phosphite | 1 | 2 |
| Mooney Scorch Rate, Minutes | | |
| $t_5$ at 287° F | 15 | 11 |
| Mooney Vulcanization Rate, Minutes | | |
| $t\Delta_{30}$ at 287° F | 6 | 3 |

The results show the increased activity obtained by increasing the amount of triphenyl phosphite in the formulations.

Samples of the compounded polyurethanes were vulcanized by heating at 287° F. for 80 minutes. The physical properties of the vulcanized elastomers are shown in Table VI.

TABLE VI

| | A | B |
|---|---|---|
| Modulus, 500% (p.s.i.) | 1,250 | 1,620 |
| Tensile strength (p.s.i.) | 4,950 | 4,830 |
| Elongation (percent) | 700 | 640 |
| Hardness, Shore A | 55 | 56 |
| Yellow index | 11.6 | 8.5 |

EXAMPLE 5

Comparison of cadmium stearate plus triphenyl phosphite in various amounts versus cadmium stearate alone; black stock Four samples of polyurethane (black stock) were compounded with the additives shown below in Table VII. Mooney scorch rates and vulcanizing rates also are shown in Table VII.

TABLE VII

| Component | Parts | | | |
|---|---|---|---|---|
| | A | B | C | D |
| Polyurethane | 100 | 100 | 100 | 100 |
| Stearic acid | 0.5 | 0.5 | 0.5 | 0.5 |
| Carbon black (SRF) | 5 | 5 | 5 | 5 |
| MBTS | 3 | 3 | 3 | 3 |
| MBT | 1 | 1 | 1 | 1 |
| Sulfur | 1 | 1 | 1 | 1 |
| Cadmium stearate | 0.5 | 0.5 | 0.5 | 0.5 |
| ZnCl$_2$.MBTS | 0.7 | 0.7 | 0.7 | 0.7 |
| Triphenyl phosphite | | 0.5 | 1 | 2 |
| Mooney Scorch Rate, Minutes | | | | |
| $t_5$ at 250° F | 27 | 20 | 19 | 9 |
| Mooney Vulcanization Rate, Minutes | | | | |
| $t\Delta_{30}$ at 250° F | 9 | 7 | 5 | 2 |

The results show the activating influence of triphenyl phosphite in black stock and the increased activating effect obtained by increasing the amount of triphenyl phosphite in the formulations.

EXAMPLE 6

Comparison of the activating influence of sodium stearate and ammonium stearate vs. that of cadmium stearate Four samples of polyurethane (white stock) were compounded with the additives shown below in Table VIII. Mooney scorch rates and vulcanizing rates also are shown in Table VIII.

TABLE VIII

| Component | Parts | | | |
|---|---|---|---|---|
| | A | B | C | D |
| Polyurethane | 250 | 250 | 250 | 250 |
| Stearic acid | 1.25 | 1.25 | 1.25 | 1.25 |
| Clay | 12.5 | 12.5 | 12.5 | 12.5 |
| Titanium dioxide | 37.5 | 37.5 | 37.5 | 37.5 |
| MBTS | 7.5 | 7.5 | 7.5 | 7.5 |
| MBT | 2.5 | 2.5 | 2.5 | 2.5 |
| Sulfur | 2.5 | 2.5 | 2.5 | 2.5 |
| ZnCl$_2$.MBTS | 2.625 | 2.625 | 2.625 | 2.625 |
| Cadmium stearate | 0.625 | 1.25 | | |
| Sodium stearate | | | 0.9375 | |
| Ammonium stearate | | | | 0.9375 |
| Mooney Scorch Rate, Minutes | | | | |
| $t_5$ at 287° F | 12 | 12 | 18 | 26 |
| Mooney Vulcanization Rate, Minutes | | | | |
| $t\Delta_{30}$ at 287° F | 3 | 3 | 4 | 6 |

These results show the weaker and inadequate activating effect of sodium stearate and ammonium stearate as compared with cadmium stearate, when used in combination with ZnCl$_2$.MBTS. It is thereby established that the sodium and ammonium salts per se, are not substitutes for the cadmium salt insofar as activities are concerned, even though they avoid the discoloration problem of the cadmium salt.

EXAMPLE 7

Comparison of various alkyl and aryl phosphites in white stock

Eight samples of polyurethane (white stock) were compounded with additives as shown below in Table IX. Various phosphites were used as activators on an equimolecular weight basis. No phosphite was used in one sample.

TABLE IX

| | Parts |
|---|---|
| Polyurethane | 100 |
| Stearic acid | 2 |
| Clay | 5 |
| Titanium dioxide | 15 |
| MBTS | 3 |
| MBT | 1 |
| Sulfur | 1 |
| ZnCl$_2$.MBTS | 0.7 |
| Sodium stearate | 0.375 |
| Phosphite activator (mole parts) | 0.0032 |

In Table X are shown the Mooney scorch rates and vulcanization rates for each sample of compounded polyurethane.

TABLE X

| Phosphite | Mooney Scorch Rate, 300° F., min. ($t_5$) | Min. ($t\Delta_{30}$) Mooney Vulcanization rate, 300° F. |
|---|---|---|
| None | 19 | 5 |
| Triphenyl phosphite | 10 | 2 |
| Trioctyl phosphite | 15 | 4 |
| Triisooctyl phosphite | 15 | 4 |
| Phenyl 2,2-dimethyltrimethylene phosphite | 9 | 2 |
| Phenyl didecyl phosphite | 12 | 3 |
| Tris(butylphenyl) phosphite | 15 | 3 |
| 4,4'-isopropylidenebis[butylphenyl bis(butylphenyl) phosphite] | 15 | 4 |

This example shows that alkyl and aryl phosphites may be used.

EXAMPLE 8

The polyurethane used in this example is essentially the same as that used in Examples 1–6 except that the isocyanate, the polyester, and the 3-allyloxy-1,2-propanediol were simultaneously reacted instead of reacting the 3-allyloxy-1,2-propanediol with the reaction product of the isocyanate and the polyester.

Two samples of polyurethane (white stock) were compounded with additives as shown in Table XI. Mooney scorch rates and vaulcanization rates also are shown in Table XI.

TABLE XI

| Component | Parts | |
| --- | --- | --- |
| | A | B |
| Polyurethane | 100 | 100 |
| Stearic acid | 0.5 | 0.5 |
| MBTS | 4 | 4 |
| MBT | 2 | 2 |
| Sulfur | 2 | 2 |
| Clay | 15 | 15 |
| Titanium dioxide | 10 | 10 |
| $ZnCl_2 \cdot MBTS$ | 1 | 1 |
| Triphenyl phosphite | | 1 |
| Cadmium stearate | 0.5 | 0.5 |

| | Mooney Scorch Rate, Minutes | |
| --- | --- | --- |
| $t_5$ at 270° F | 8.6 | 7.5 |

| | Mooney Vulcanization Rate, Minutes | |
| --- | --- | --- |
| $t\Delta_{30}$ at 270° F | 3.5 | 2.9 |

The lower values for Mooney scorch rate and vulcanizing rate of the elastomer containing triphenyl phosphite demonstrates the activating action of triphenyl phosphite in white stock using cadmium stearate and zinc chloride: MBTS complex as cooperating activators.

Samples of the compounded polyurethanes were vulcanized by heating at 270° F. for 44 minutes. The physical properties of the vulcanized elastomers are shown in Table XII.

TABLE XII

| | A | B |
| --- | --- | --- |
| Tensile strength (p.s.i.) | 5,620 | 5,380 |
| Modulus, 500% (p.s.i.) | 3,260 | 2,975 |
| Elongation (percent) | 620 | 640 |
| Hardness, Shore A | 60 | 60 |
| Yellow index | 13.2 | 11.1 |

The results show that by using triphenyl phosphite in the formulation, a stock of less discoloration is obtained even when cadmium stearate is employed in the formulation.

We claim:
1. In the process of curing a sulfur-curable polyurethane elastomer, said elastomer containing pendant, non-benzenoid —CH=CH— groups and being prepared from (A) an organic diisocyanate, (B) an hydroxyl-terminated polyester and (C) 3-allyloxy-1,2-propanediol, by heating said elastomer with (a) from about 0.5 to 2.0 part of sulfur per one hundred parts of elastomer and (b) from about 0.25 to 2.0 parts of a zinc chloride complex of 2,2'-dithiobisbenzothiazole per one hundred parts of elastomer, the improvement which comprises conducting said heating at a temperature in the range of about 270° F. to 330° F. in the presence of (1) 0.2 to 2.0 parts of cadmium stearate per one hundred parts of elastomer and (2) 0.5 to 5.0 parts of an alkyl, aryl, aralkyl or alkaryl phosphite per one hundred parts of elastomer.

2. In the process of vulcanizing sulfur-vulcanizable, olefinic polyurethanes with sulfur and a rubber vulcanization accelerator, the improvement which comprises forming a vulcanizable mixture containing a sulfur-vulcanizable polyurethane containing pedant, non-benzenoid —CH=CH— groups, of between 0.5 and 5.0% of an alkyl, aryl, alkaryl or aralkyl phosphite and between 0.25 and 2.0% of a zinc chloride complex of 2,2'-dithiobisbenzothiazole, based on the amount of polyurethane; and vulcanizing said sulfur-vulcanizable mixture.

3. The process of claim 2 wherein the phosphite is a trisaryl phosphite.

4. The process of claim 2 wherein 0.2–2.0 parts of a stearic acid salt selected from the group consisting of sodium, potassium, and cadmium stearate are present as an auxiliary activator.

5. The process of claim 2 wherein the phosphite is triphenyl phosphite.

6. The process of claim 4 wherein the stearic acid salt in cadmium stearate.

7. The vulcanizate produced by the process of claim 2.
8. The vulcanizate produced by the process of claim 3.
9. The vulcanizate produced by the process of claim 4.

References Cited

UNITED STATES PATENTS

| 2,895,926 | 7/1959 | Rappaport et al. | 260—2.5 |
| 2,921,926 | 1/1960 | Kehr | 260—77.5 |
| 3,168,497 | 2/1965 | Twitchett | 260—77.5 |

OTHER REFERENCES

Britain et al.: Jour. of Applied Polymer Science, vol. IV, issue No. 11 (1960), pp. 207–211.

DONALD E. CZAJA, Primary Examiner

H. S. COCKERAM, Assistant Examiner

U.S. Cl. X.R.

260—23, 37, 45, 75, 77